United States Patent
Deole et al.

(10) Patent No.: US 10,135,985 B1
(45) Date of Patent: Nov. 20, 2018

(54) IMMEDIATE RECONNECTION OF A CALL TO AN AGENT IN A CONTACT CENTER

(71) Applicant: Avaya Inc., Basking Ridge, NJ (US)

(72) Inventors: Pushkar Deole, Maharashtra (IN); Jibin George, Maharashtra (IN)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 15/886,697

(22) Filed: Feb. 1, 2018

(51) Int. Cl.
*H04M 3/523* (2006.01)
*H04M 3/51* (2006.01)

(52) U.S. Cl.
CPC ........ *H04M 3/5231* (2013.01); *H04M 3/5183* (2013.01); *H04M 3/523* (2013.01); *H04M 2203/2088* (2013.01)

(58) Field of Classification Search
CPC .. H04M 3/5183; H04M 3/523; H04M 3/5166; H04M 3/5232; H04M 3/5233; H04M 3/42059; H04M 3/5238; H04M 2203/551; H04M 2203/558
See application file for complete search history.

(56) References Cited

U.S. PATENT DOCUMENTS

| | | | | |
|---|---|---|---|---|
| 7,688,963 | B1* | 3/2010 | Lang ............ | H04M 3/12 379/215.01 |
| 8,582,750 | B2* | 11/2013 | Lee ............ | H04M 3/12 379/265.02 |
| 2004/0235509 | A1* | 11/2004 | Burritt ............ | H04M 3/42195 455/519 |

* cited by examiner

*Primary Examiner* — Nafiz E Hoque

(57) ABSTRACT

The technology disclosed herein enables a call to be immediately reconnected to an agent of a contact center after the agent has been disconnected. In a particular embodiment, a method provides, determining that a first agent system, operated by a first agent of a plurality of agents for the contact center, has been disconnected from a call between the first agent system and a first caller system operated by a first caller. The first caller system remains connected to the contact center. If the first agent system was disconnected due to a recoverable error, the method provides reconnecting the call to the first agent system once the first agent system has recovered. If the first agent system was disconnected due to a non-recoverable error, the method provides prioritizing the reconnection of the call to another one of the plurality of agents.

20 Claims, 7 Drawing Sheets

IMMEDIATE RECONNECTION OF A CALL TO AN AGENT IN A CONTACT CENTER

TECHNICAL BACKGROUND

Agents in modern contact centers are able to communicate with customers, or other types of callers, using packet-based technologies and communication protocols, such as Web Real-Time Communications (WebRTC). These technologies allow agents to communicate with callers using communications beyond the typical voice communications that legacy technologies provide, such as video, chat, desktop sharing, etc. Additionally, these technologies allow a contact center to be distributed in nature, which allows the agents be located anywhere with a network connection, such as their own home. To connect a caller to an agent, the caller may need to answer questions about a call (e.g., via an interactive voice response system (IVR), via a web interface, via a client interface, etc.) and, if no agent is readily available, may be placed in a queue until an agent is available. After being routed to an agent, should the agent become disconnected from the communication with the call, the caller may need to call back, re-answer the previous questions and/or wait in yet another queue before reconnecting with the agent.

SUMMARY

The technology disclosed herein enables a call to be immediately reconnected to an agent of a contact center after the agent has been disconnected. In a particular embodiment, a method provides, determining that a first agent system, operated by a first agent of a plurality of agents for the contact center, has been disconnected from a call between the first agent system and a first caller system operated by a first caller. The first caller system remains connected to the contact center. If the first agent system was disconnected due to a recoverable error, the method provides reconnecting the call to the first agent system once the first agent system has recovered. If the first agent system was disconnected due to a non-recoverable error, the method provides prioritizing the reconnection of the call to another one of the plurality of agents.

In some embodiments, determining that the first agent system has been disconnected comprises receiving a first notification from a call system facilitating the exchange of media for the call, wherein the first notification indicates whether the call was disconnected due to a recoverable error or a non-recoverable error. In these embodiments, a call client executing on the first agent system may notify the call system when the first agent system has been disconnected due to a recoverable error.

In some embodiments, the plurality of agents are separated into a plurality of groups and wherein prioritizing the reconnection of the call comprises, if a second agent of the plurality of agents in the same group of the plurality of groups as the first agent is available, reconnecting the call to a second agent system operated by the second agent. If the second agent is not available but a supervisor of the same group is available, reconnecting the call to a first supervisor system operated by the supervisor of the same group. If the second agent and the supervisor of the same group are not available but a third agent from a fallback group of the plurality of groups is available, reconnecting the call to a third agent system operated by the third agent. If the second agent, the supervisor of the same group, and the third agent are not available but a supervisor of the fallback group is available, reconnecting the call to a second supervisor system operated by the supervisor of the fallback group. If the second agent, the supervisor of the same group, the third agent, and the supervisor of the fallback group are not available, transferring a second notification to the first caller system indicating an estimated amount of time until the call will be reconnected. In some embodiments, the method provides reconnecting the call to a system operated by an agent or supervisor of the same group or the fallback group to first come available. In some embodiments, the notification further provides the first caller with an option to convert the call to a text chat and the method further provides, upon receiving an indication that the first caller has selected the option, converting the call to a text chat and connecting the text chat to a fourth agent system operated by a fourth agent.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to determine that a first agent system, operated by a first agent of a plurality of agents for the contact center, has been disconnected from a call between the first agent system and a first caller system operated by a first caller. The first caller system remains connected to the contact center. If the first agent system was disconnected due to a recoverable error, the program instructions direct the processing system to reconnect the call to the first agent system once the first agent system has recovered. If the first agent system was disconnected due to a non-recoverable error, the program instructions direct the processing system to prioritize the reconnection of the call to another one of the plurality of agents.

DETAILED DESCRIPTION

An agent of a contact center may be disconnected from a caller for any number of reasons, however, the technology described below allows for immediate reconnection of a caller to an agent when the caller remains connected to a contact center system. For example, an error may occur on the agent's client system that disconnects the agent's client system from the contact center system which facilitates the communications between the caller's client system and the agent's client system. In such a circumstance, the caller's client system would remain connected to the contact center system. Therefore, the contact center system to which the call is connected, or another system of the contact system, can reconnect the call to the specific agent or another agent in the contact center without needing to reconnect to the caller's client system as well.

Figure 1:
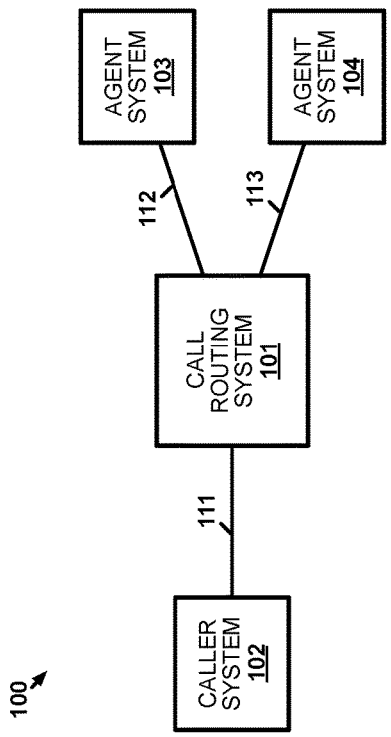
FIG. 1 illustrates an implementation for immediately reconnecting a call to an agent in a contact center.

FIG. 1 illustrates implementation 100 for immediately reconnecting a call to an agent in a contact center. Implementation 100 includes call routing system 101, caller client system 102, agent client system 103, and agent client system 104. Call routing system 101 and caller client system 102 communicate over communication link 111. Call routing system 101 and agent client system 103 communication over communication link 112. Call routing system 101 and agent client system 104 communicate over communication link 113. Communication links 111-113 may comprise wireless and/or wired communication links and may include intervening communication networks, systems, and devices.

In operation, call routing system 101 routes calls with a contact center to one of agent client system 103 and agent client system 104, which are operated by respective agents of the contact center. Caller client system 102, agent client system 103, and agent client system 104 may each comprise a phone, tablet, laptop computer, desktop workstation, or some other type of computing device having processing circuitry and a communication interface circuitry to exchange the call communications described below. Agents of the contact center, and their respective agent client systems, may be co-located or may be distributed across multiple locations. In this example, the contact center only has two agents to choose between although other examples could have any number of agents. It should be understood that the calls discussed herein could be voice, video, text chat, or some other mode for user communications between people. Likewise, a call may be initiated by a caller or by the contact center (e.g., call routing system 101 may select an agent and call out to a caller). Regardless, once a call is connected between caller client system 102 and one of agent client system 103 and agent client system 104, call routing system 101 is able to immediately reconnect the call to the same one of agent client system 103 and agent client system 104 or, if not available, attempt to reconnect the call to another system, such as the other of agent client system 103 and agent client system 104.

Figure 2:
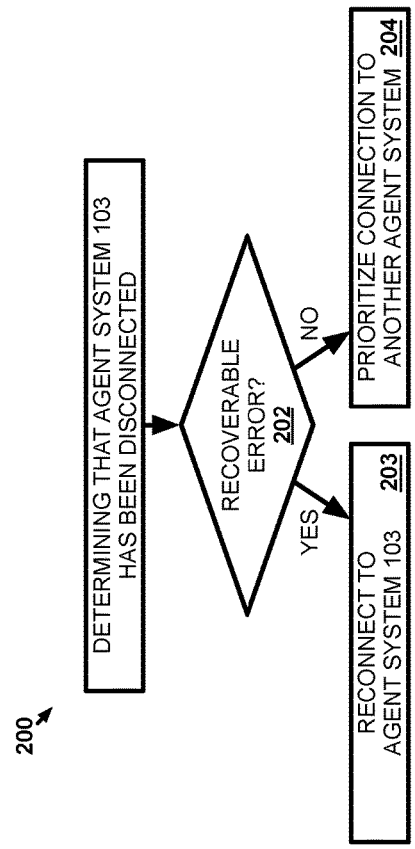
FIG. 2 illustrates a scenario for the implementation to immediately reconnect a call to an agent in a contact center.

FIG. 2 illustrates scenario 200 for implementation 100 to immediately reconnect a call to an agent in a contact center. In this example, a call has been established between caller client system 102, operated by a caller, and agent client system 103 by call routing system 101 so that the caller can speak with the agent operating agent client system 103, or exchange other user communications with the agent. User communications for the call may be transferred via another system of the contact center once call routing system 101 has performed its necessary functions to setup the call. Scenario 200 provides call routing system 101 determining that agent client system 103 has been disconnected from the call (201). Caller client system 102 remains connected to a system of the contact center, if not call routing system 101 itself. The call may be disconnected due to a recoverable error on the part of agent client system 103 or may be disconnected due to non-recoverable error.

Scenario 200 provides call routing system 101 determining whether the error causing agent client system 103 to disconnect was a recoverable error (202). Call routing system 101 may be in communication with agent client system 103, directly or through another system (e.g., a server for the protocol used for the connection with agent client system 103, such as a WebRTC system) outside of the user communications exchanged between caller client system 102 and agent client system 103 and may therefore be informed by agent client system 103 about whether a recoverable error has occurred. Likewise, agent client system 103 may inform call routing system 101 of the type of error and/or an amount of time agent client system 103 may need to recover. A recoverable error comprises an error from which agent client system 103 may recover from relatively quickly so as to allow call routing system 101 to immediately attempt to reconnect the call with agent client system 103. Examples of recoverable errors may include a client software crash on agent client system 103, a web browser crash on agent client system 103 (where the client executes within a browser window), java script errors on agent client system 103, higher than normal CPU utilization on agent client system 103, possibly do to another program (including malware) that may be executing on agent client system 103, which may cause a momentary malfunction of agent client system 103, or some other condition that would cause client software executing on agent client system 103 to lose the connection between agent client system 103 and call routing system 101 but would still allow the connection to be recovered relatively quickly. A non-recoverable error comprises any other type of error that would not allow for the connection to be recovered relatively quickly. For example, communication link 112 may go down indefinitely, agent client system 103 may crash and require rebooting, agent client system 103 may lose power, or some other type of error may occur that requires agent client system 103 to be disconnected from call routing system 101 for a longer than desired amount of time (e.g., since call routing system 101 will attempt to reconnect the call substantially immediately, any error that takes more than a few seconds to cure may be considered a non-recoverable error).

If agent client system 103 was disconnected due to a recoverable error, call routing system 101 reconnects the call to caller client system 102 once agent client system 103 has recovered (203). As noted above, call routing system 101 may be in communication with agent client system 103 outside of the user communications exchanged between caller client system 102 and agent client system 103. As such, agent client system 103 may inform call routing system 101 when agent client system 103 has recovered, which triggers call routing system 101 to reconnect the call to agent client system 103. In other examples, call routing system 101 may wait a predetermined amount of time (e.g., 5 seconds), which may depend on the type of recoverable error, before attempting to reconnect to agent client system 103. Call routing system 101 may attempt to reconnect multiple times until a connection can be reestablished with agent client system 103. In some cases, if call routing system 101 cannot reconnect to agent client system 103 within a predetermined amount of time after the disconnection was determined (or after a predetermined number of reconnect attempts), then call routing system 101 may revert to the procedure described below for non-recoverable errors.

If agent client system 103 was disconnected due to a non-recoverable error, call routing system 101 prioritizes the reconnection of the call to another one of the contact center's agents, such as the agent operating agent client system 104 (204). Essentially, call routing system 101 prioritizes the call to ensure the caller can resume their communications with an agent as quickly as possible. If necessary, call routing system 101 may select an agent that is not as well suited to handle the call as the agent operating agent client system 103 was, when another similarly, or better, suited agent is not available. Also, call routing system 101 may offer to switch communication modes should an agent be available more quickly in another mode. For example, an agent may be available in a text chat sooner than another agent to continue the voice call.

Advantageously, since caller client system 102 never disconnects from the contact center, call routing system 101 is able to reconnect the caller using caller client system 102 to an agent immediately after determining that agent client system 103 has disconnected. Even if that agent is not the same agent as before the disconnect, the caller need not go through the process of contacting the contact center again.

Figure 3:
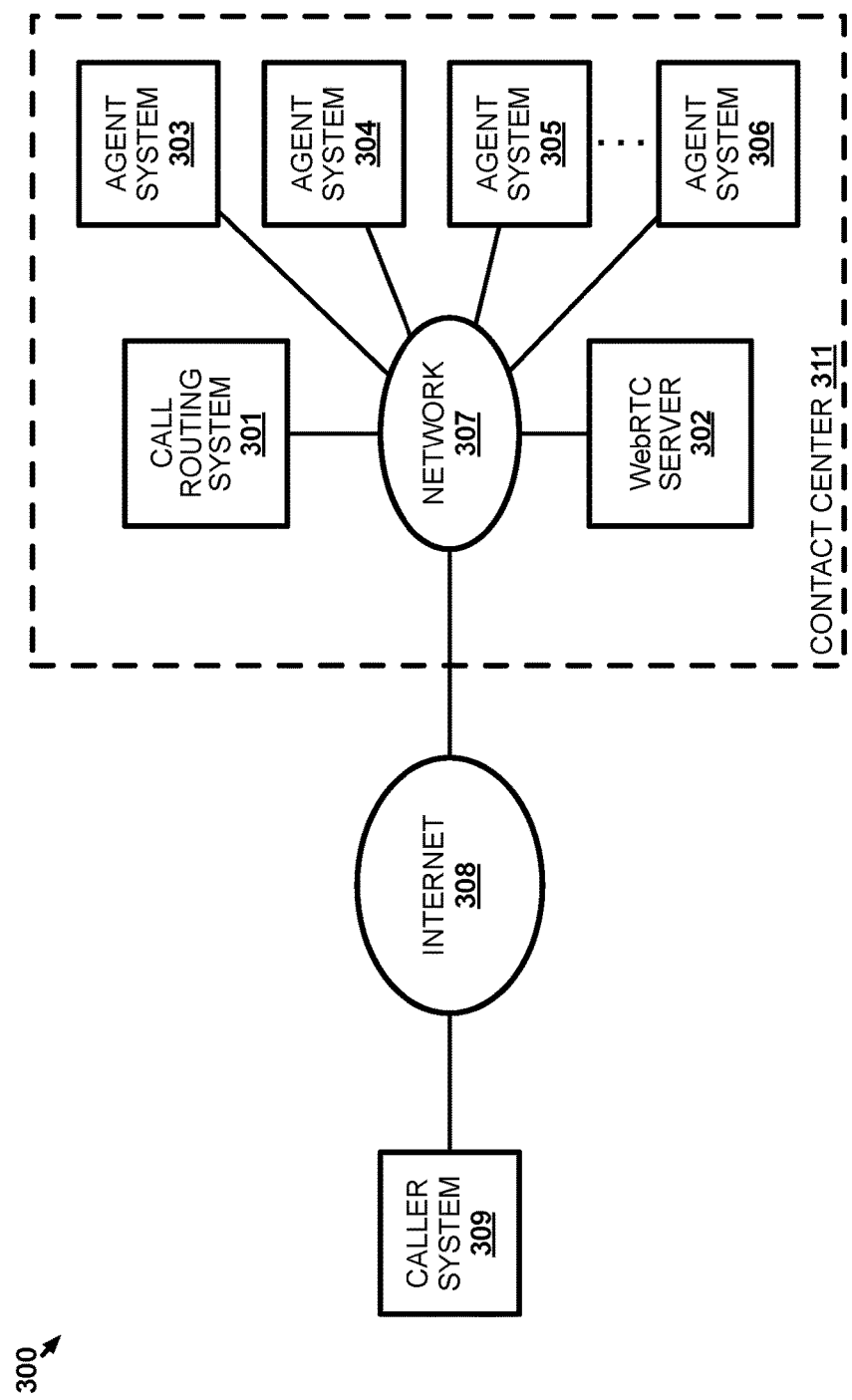
FIG. 3 illustrates another implementation for immediately reconnecting a call to an agent in a contact center.

FIG. 3 illustrates implementation 300 for immediately reconnecting a call to an agent in a contact center. Implementation 300 includes call routing system 301, WebRTC server 302, agent client system 303, agent client system 304, agent client system 305, agent client system 306, contact center network 307, Internet 308, and caller client system 309. Although, call routing system 301, WebRTC server 302, agent client system 303, agent client system 304, agent client system 305, agent client system 306, and contact center network 307 are part of contact center 311, no element of contact center 311 need be co-located with another. As such, contact center network 307 may use Internet 308, and possibly other local area networks, to exchange communications with one or more of call routing system 301, WebRTC server 302, agent client system 303, agent client system 304, agent client system 305, and agent client system 306. While only four agent client systems are shown in implementation 300, contact center 311 may include any number of agent client systems.

In this example, WebRTC is used to exchange communications between client systems and WebRTC server 302 handles the exchange of those communications. Call routing system 301 works with WebRTC server 302 to select to which of agent client system 303, agent client system 304, agent client system 305, and agent client system 306 a call with contact center 311 should be routed. Once selected, call routing system 301 instructs WebRTC server 302 to establish a WebRTC connection with the selected agent client system for user communications to be exchanged. In the examples below, caller client system 309 is also using WebRTC, via a WebRTC client executing thereon, and will have a similar connection to WebRTC server 302 established. However, in other examples, caller client system 309 may connect to contact center 311 in some other manner (e.g., a traditional telephone call) and WebRTC server 302, or some other system of contact center 311, will act as a gateway to the WebRTC connection with the selected agent client system.

Figure 4:
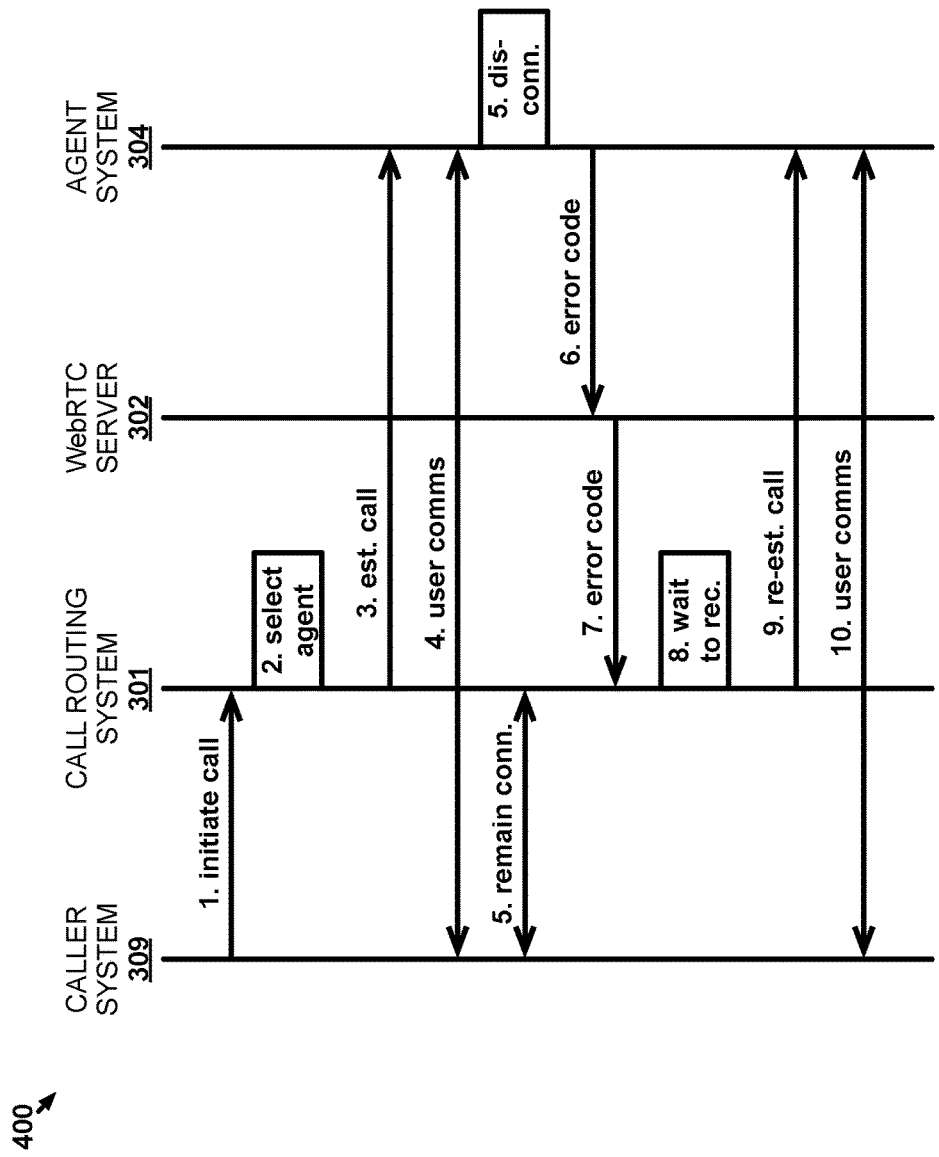
FIG. 4 illustrates a scenario for the other implementation to immediately reconnect a call to an agent in a contact center.

FIG. 4 illustrates scenario 400 for implementation 300 to immediately reconnect a call to an agent in a contact center. Caller client system 309 initiates a call request at step 1 for caller client system 309's user to speak with an agent over a voice WebRTC communication. Responsive to call routing system 301 receiving the call request, call routing system 301 selects an agent that should handle the call at step 2 so that the call can be routed to the agent client system operated by that agent. In some cases, the call may be placed in a queue until an agent is available. In this example, the agent operating agent client system 304 is selected. The agent operating agent client system 304 may be selected after call routing system 301 receives information from caller client system 309 about a reason for the call. For example, the information may indicate that the customer has a particular issue (such as a technical problem) that they need help with or are calling for information about a particular product before purchasing that product. Contact center 311 may include agents trained to handle any number of issues. An IVR system of contact center 311, a web interface, or some other type of query mechanism may be employed by call routing system 301 to obtain information about the call from the caller.

Call routing system 301 then instructs WebRTC server 302 to establish a WebRTC call at step 3 between agent client system 304 and caller client system 309. User communications, voice in this case, are then exchanged at step 4 between caller client system 309 and agent client system 304. In particular, user communications are exchanged on a connection between caller client system 309 and WebRTC server 302 through call routing system 301 and a separate connection between agent client system 304 and WebRTC server 302. Ideally, the exchange of user communications will simply continue until either the user of caller client system 309 or the agent of agent client system 304 instruct their respective clients otherwise. However, in this situation, an error occurs that causes agent client system 304 to disconnect from WebRTC server 302 at step 5 during the exchange of user communications while caller client system 309 remains connected to call routing system 301.

In scenario 400, the error is a recoverable error, which means that the WebRTC client is still executing, or recovers quickly, on agent client system 304 such that the WebRTC client can direct agent client system 304 to send an error code at step 6 to WebRTC server 302. The error code may simple state that an error occurred or may describe the error in more detail (e.g., describe the type of error). Since WebRTC server 302 received an error code, WebRTC server 302 knows that a recoverable error occurred at agent client system 304. As such, WebRTC server 302 passes the error code at step 7 to call routing system 301. The error code may be the same error code received by WebRTC server 302 or may be a different error code depending on the type of error notifications call routing system 301 is configured to receive.

In response to receiving the error code, call routing system 301 waits at step 8 until agent client system 304 recovers to the point of allowing a WebRTC connection to be reestablished with agent client system 304. The amount of time that call routing system 301 waits is relatively small (e.g., a few seconds at most) so as to minimize the disruption perceived by the user of caller client system 309. In some cases, call routing system 301 may send a notification to caller client system 309 that call routing system 301 is waiting for agent client system 304 to recover so that the user is not left wondering why the call has gone silent.

After waiting, call routing system 301 directs WebRTC server 302 to reestablish the WebRTC call with agent client system 304 at step 9 and connects caller client system 309 through to the reestablished connection with agent client system 304. Once the WebRTC call is reestablished, the user communications continue to be exchanged between caller client system 309 and agent client system 304 in the same manner as before the error occurred.

Figure 5:
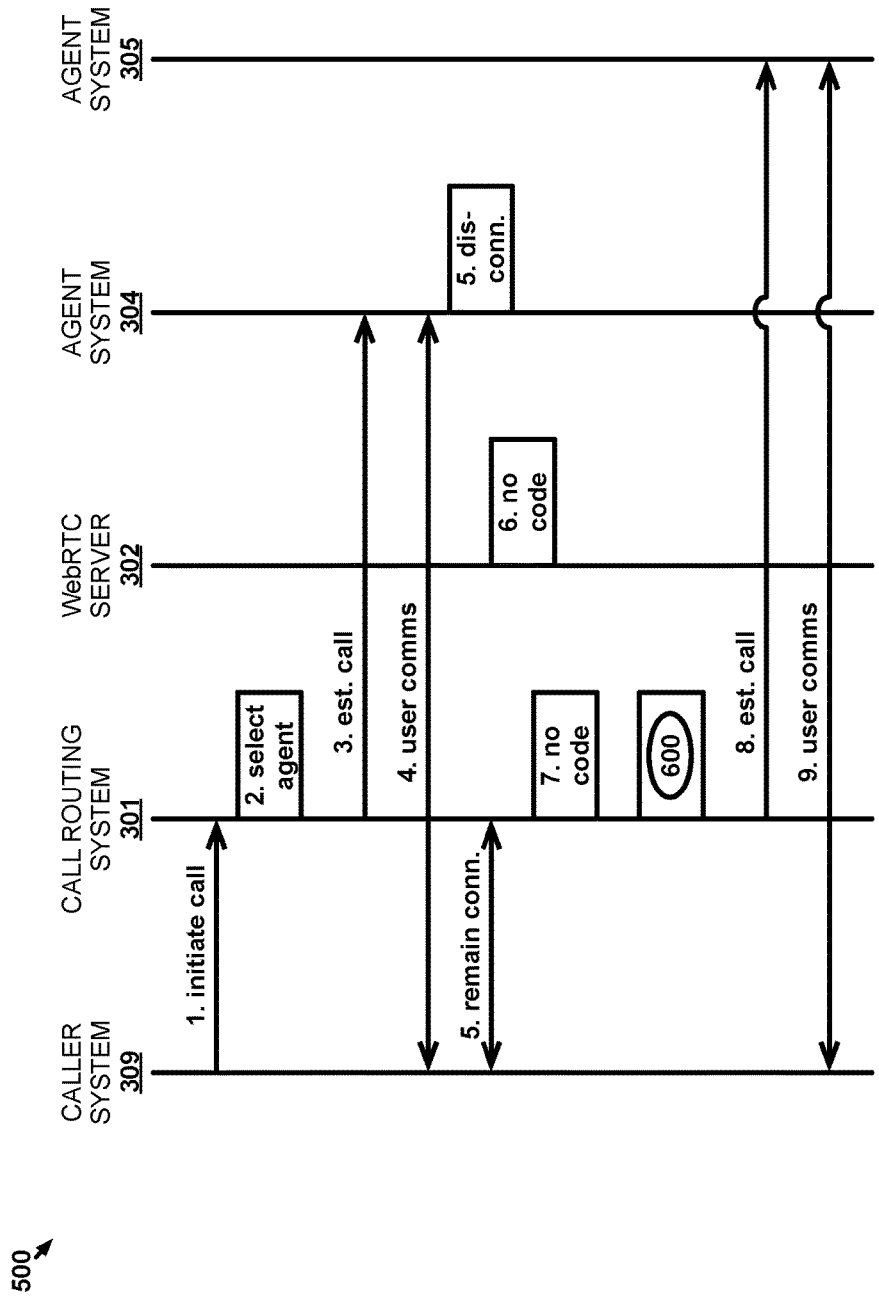
FIG. 5 illustrates another scenario for the other implementation to immediately reconnect a call to an agent in a contact center.

FIG. 5 illustrates scenario 500 for implementation 300 to immediately reconnect a call to an agent in a contact center. Scenario 500 begins similarly to scenario 400 with steps 1-4 establishing a WebRTC call between caller client system 309 and agent client system 304. Likewise, at step 5, agent client system 304 is disconnected from WebRTC server 302 while caller client system 309 remains connected to call routing system 301. However, in scenario 500, the error is a non-recoverable error, which means agent client system 304 is unable to send an error code indicating to WebRTC server 302 that a recoverable error occurred, as was the case in scenario 400. Accordingly, WebRTC server 302 never receives an error code at step 6 and is unable to pass an error code on to call routing system 301 at step 7. Call routing system 301 may simply infer that a non-recoverable error has occurred when user communications stop and call routing system 301 received no error code indicating otherwise within a predetermined period of time. Although, in some examples, WebRTC server 302 may transfer a different error code WebRTC server 302 that indicates to call routing system 301 that agent client system 304 has suffered a non-recoverable error. Once call routing system 301 determines that a non-recoverable error has occurred call routing system 301 performs as described in scenario 600 rather than defaulting to its normal call routing procedure for incoming calls, such as that performed in step 2.

Figure 6:
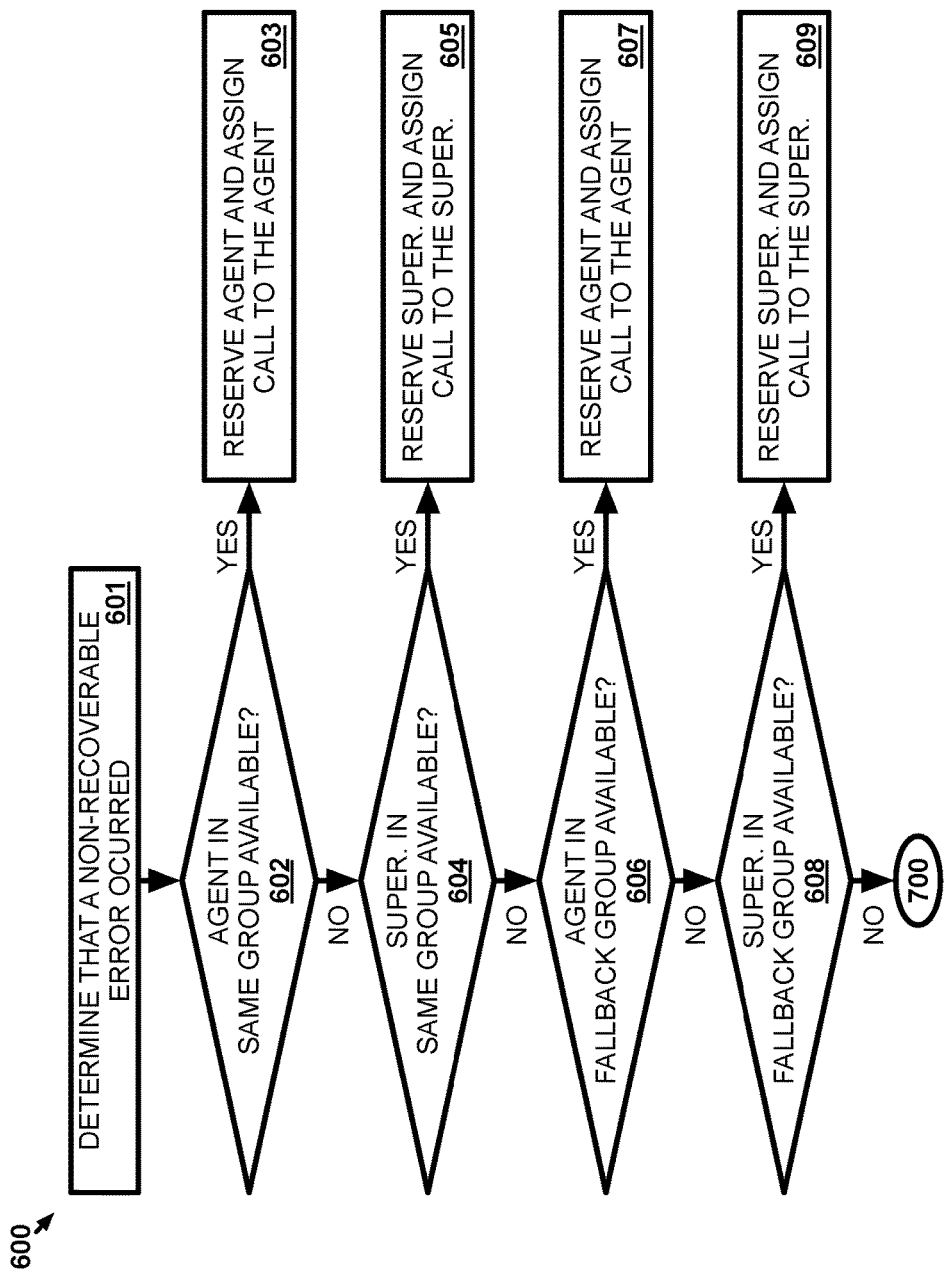
FIG. 6 illustrates a further scenario for the other implementation to immediately reconnect a call to an agent in a contact center.

FIG. 6 illustrates scenario 600 for implementation 300 to immediately reconnect a call to an agent in a contact center. As mentioned already above, scenario 600 begins once call routing system 301 determines that a non-recoverable error has occurred to disconnect agent client system 304 (601). Since call routing system 301 cannot therefore reconnect the call to agent client system 304, call routing system 301 determines whether an agent in the same group as the agent of agent client system 304 is available (602). Presumably an agent in the same group will be able to handle the call with a similar amount of expertise to the agent of agent client system 304. If such an agent is available, call routing system 301 reserves the agent for the call (e.g., to prevent another call, either incoming or waiting in a queue, from being routed to the agent) and then assigns the call to the agent (603).

If no agent in the same group is available, then call routing system 301 determines whether a supervisor of the agents in the same group is available (604). As with other agents in the same group, a supervisor in that same group presumably will be able to handle the call with a similar amount of expertise to the agent of agent client system 304. If a supervisor in the same group is available, call routing system 301 reserves the supervisor for the call and then assigns the call to the supervisor (605).

If a supervisor from the same group is also not available, then call routing system 301 determines whether an agent in a fallback group is available (606). The fallback group may be a group having similar responsibilities as the agent of agent client system 304's group or may have been designated to call routing system 301 for some other reason. Regardless, even if agents in the fallback group are not ideal for handling calls previously handled by the agent of agent client system 304, the user of caller client system 309 would likely rather be reconnected to any agent immediately rather than having to wait. As such, if an agent in the fallback group is available, call routing system 301 reserves the agent for the call and then assigns the call to the agent (607).

If no agent in the fallback group is available, then call routing system 301 determines whether a supervisor of the agents in the fallback group is available (608). If a supervisor in the fallback group is available, call routing system 301 reserves the supervisor for the call and then assigns the call to the supervisor (609). Otherwise, if a supervisor in the fallback group is not available, then scenario 600 proceeds to scenario 700. In some examples, there may be one or more even further fallback groups of agents that call routing system 301 will check to determine whether an agent or supervisor is available in those groups before proceeding to scenario 700.

Figure 7:
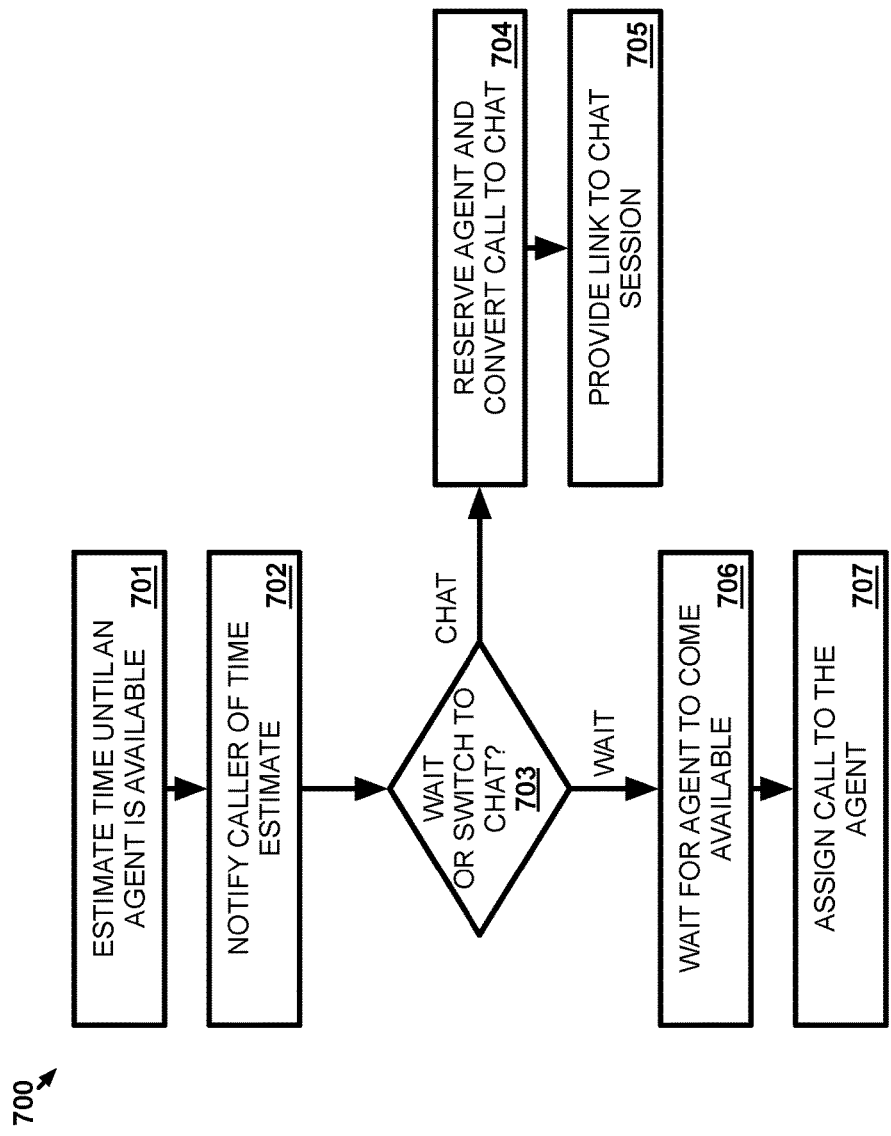
FIG. 7 illustrates yet another scenario for the other implementation to immediately reconnect a call to an agent in a contact center.

FIG. 7 illustrates scenario 700 for implementation 300 to immediately reconnect a call to an agent in a contact center. As noted above, scenario 700 is a continuation of scenario 600 when no agents or supervisors in the same group or fallback group are found by call routing system 301 to be available. In scenario 700, call routing system 301 estimates an amount of time until an agent, or supervisor, will be available (701). The estimate may be based on historical data indicating how long agents typically take on various types of calls to contact center 311, although other factors may be used as well or instead. Call routing system 301 may estimate a time till availability for each agent and supervisor of the same group and the fallback group discussed above and then use the lowest estimated time.

Call routing system 301 then notifies the caller of the estimated time by transferring a notification message to caller client system 309 (702). In this example, call routing system 301 further instructs caller client system 309 to present its user, the caller, with the option to wait until an agent is available or to switch the call to a text chat (703). Agents can typically handle multiple text chat sessions at the same time, which increases the likelihood that an agent will be immediately available to help the caller without the caller having to wait. If the caller uses caller client system 309 to request a change to chat, call routing system 301 reserves an agent for a chat session and converts the voice call to a text chat session (704). Also, if the call cannot be converted to a chat session automatically by call routing system 301, then call routing system 301 transfers a message to caller client system 309 that provides a link to the chat session (705). A user may then select the link if caller client system 309 is not configured to automatically follow the provided link. Regardless, since agents that use chat channels are typically capable of handling multiple chat sessions at the same time, it is more likely an agent will be available to chat immediately even if that agent is already handling one or more other chat sessions.

If, however, the caller uses caller client system 309 to indicate that they wish to wait for an agent to continue the voice call, then call routing system 301 waits until an agent becomes available (706). Effectively, call routing system 301 places the call in a very high priority queue to ensure caller client system 309 is connected as soon as an agent becomes available. Once an agent becomes available, the call is assigned to that available agent (707).

Referring back to scenario 500, agent client system 305 is the agent system operated by whichever agent or supervisor is assigned to the call in scenario 600 and scenario 700 above. Call routing system 301 directs WebRTC server 302 to establish a WebRTC call with agent client system 305 at step 8 in the same manner a call was established with agent client system 304 at step 3. Likewise, after call establishment, user communications can then be exchanged between caller client system 309 and agent client system 305 in the same manner they were exchanged between caller client system 309 and agent client system 304 at step 4. It should also be understood that steps 8 and 9 would instead establish and exchange text chat communications had the agent of agent client system 305 been selected for text chat in accordance with scenario 700. Regardless of whether the call continues to be a voice call or has been converted to a chat session, call routing system 301 has at least attempted to immediately reconnect (i.e., unless the caller chooses to wait at step 705 of scenario 700) the caller at caller client system 309 to a live agent when agent client system 304 gets disconnected from WebRTC server 302.

Figure 8:
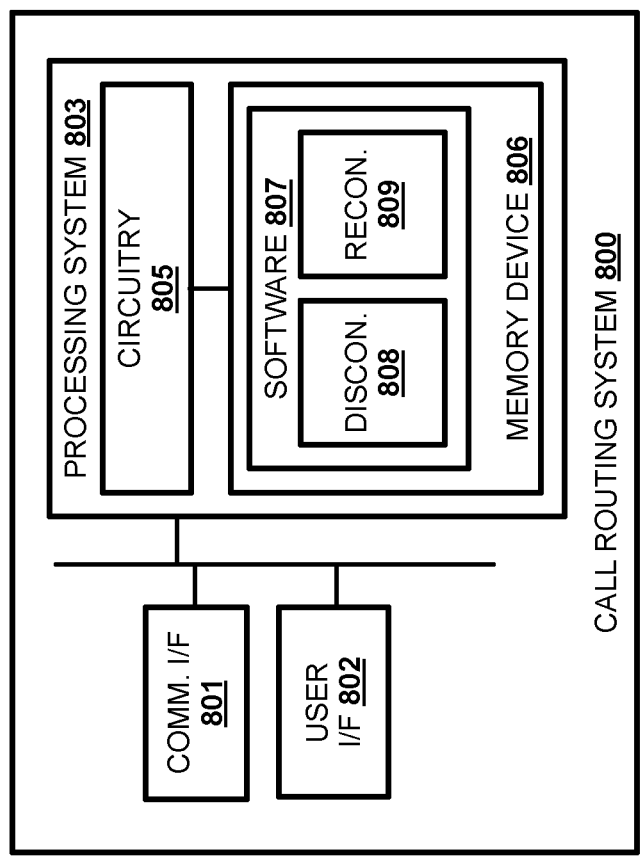
FIG. 8 illustrates a computing architecture for immediately reconnecting a call to an agent in a contact center.

FIG. 8 illustrates call routing system 800 for immediately reconnecting a call to an agent in a contact center. Call routing system 800 is an example computing architecture for a call routing system 101, although system 101 may use alternative configurations. A similar architecture may also be used for a client system, although alternative configurations may also be used. Call routing system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a storage medium, such as a disk drive, flash drive, data storage circuitry, or some other memory apparatus. In no examples would memory device 806 be considered a propagated signal. Operating software 807 comprises computer programs, firmware, or some other form of machine-readable processing instructions. Operating software 807 includes disconnect determination module 808 and reconnection module 809. Operating software 807 may further include an operating system, utilities, drivers, network interfaces, applications, or some other type of software. When executed by processing circuitry 805, operating software 807 directs processing system 803 to operate call routing system 800 as described herein.

In particular, disconnect determination module 808 directs processing system 803 to determine that a first agent system, operated by a first agent of a plurality of agents for the contact center, has been disconnected from a call between the first agent system and a first caller system operated by a first caller. The first caller system remains connected to the contact center. If the first agent system was disconnected due to a recoverable error, reconnection module 809 directs processing system 803 to reconnect the call to the first agent system once the first agent system has recovered. If the first agent system was disconnected due to a non-recoverable error, reconnection module 809 directs processing system 803 to prioritize the reconnection of the call to another one of the plurality of agents.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for reconnecting a call to an agent of a contact center, the method comprising:
   determining that a first agent system, operated by a first agent of a plurality of agents for the contact center, has been disconnected from a call between the first agent system and a first caller system operated by a first caller, wherein the first caller system remains connected to the contact center;
   before attempting to reconnect the call, determining whether the first agent system notifies a call routing system that the first agent system was disconnected due to a recoverable error within a predetermined period of time;
   if the first agent system was disconnected due to a recoverable error, reconnecting the call to the first agent system once the first agent system has recovered; and
   if the first agent system was disconnected due to a non-recoverable error, prioritizing reconnection of the call to another one of the plurality of agents.

2. The method of claim 1, wherein determining whether the first agent system indicated that the first agent system was disconnected due to a recoverable error comprises:
   receiving a first notification from the call routing system facilitating exchange of media for the call, wherein the first notification indicates whether the call was disconnected due to a recoverable error, as indicated by the first agent system, or a non-recoverable error.

3. The method of claim 2, wherein for the first routing agent system to notify that the call was disconnected due to a recoverable error, a call client executing on the first agent system notifies the call routing system when the first agent system has been disconnected due to a recoverable error.

4. The method of claim 1, wherein the plurality of agents are separated into a plurality of groups and wherein prioritizing the reconnection of the call comprises:
   if a second agent of the plurality of agents in the same group of the plurality of groups as the first agent is available, reconnecting the call to a second agent system operated by the second agent.

5. The method of claim 4, wherein prioritizing the reconnection of the call further comprises:
   if the second agent is not available but a supervisor of the same group is available, reconnecting the call to a first supervisor system operated by the supervisor of the same group.

6. The method of claim 5, wherein prioritizing the reconnection of the call further comprises:
   if the second agent and the supervisor of the same group are not available but a third agent from a fallback group of the plurality of groups is available, reconnecting the call to a third agent system operated by the third agent.

7. The method of claim 6, wherein prioritizing the reconnection of the call further comprises:
   if the second agent, the supervisor of the same group, and the third agent are not available but a supervisor of the fallback group is available, reconnecting the call to a second supervisor system operated by the supervisor of the fallback group.

8. The method of claim 7, wherein prioritizing the reconnection of the call further comprises:
   if the second agent, the supervisor of the same group, the third agent, and the supervisor of the fallback group are not available, transferring a second notification to the first caller system indicating an estimated amount of time until the call will be reconnected.

9. The method of claim 8, wherein prioritizing the reconnection of the call further comprises:
reconnecting the call to a system operated by an agent or supervisor of the same group or the fallback group to first come available.

10. The method of claim 8, wherein the second notification further provides the first caller with an option to convert the call to a text chat and the method further comprising:
upon receiving an indication that the first caller has selected the option, converting the call to a text chat and connecting the text chat to a fourth agent system operated by a fourth agent.

11. An apparatus for reconnecting a call to an agent of a contact center, the apparatus comprising:
one or more computer readable storage media;
a processing system operatively coupled with the one or more computer readable storage media; and
program instructions stored on the one or more computer readable storage media that, when read and executed by the processing system, direct the processing system to:
determine that a first agent system, operated by a first agent of a plurality of agents for the contact center, has been disconnected from a call between the first agent system and a first caller system operated by a first caller, wherein the first caller system remains connected to the contact center;
before attempting to reconnect the call, determine whether the first agent system notifies a call routing system that the first agent system was disconnected due to a recoverable error within a predetermined period of time;
if the first agent system was disconnected due to a recoverable error, reconnect the call to the first agent system once the first agent system has recovered; and
if the first agent system was disconnected due to a non-recoverable error, prioritize reconnection of the call to another one of the plurality of agents.

12. The apparatus of claim 11, wherein to determine whether the first agent system indicated that the first agent system was disconnected due to a recoverable error, the program instructions direct the processing system to:
receive a first notification from the call routing system facilitating exchange of media for the call, wherein the first notification indicates whether the call was disconnected due to a recoverable error, as indicated by the first agent system, or a non-recoverable error.

13. The apparatus of claim 12, wherein for the first agent system to indicate that the call was disconnected due to a recoverable error, a call client executing on the first agent system notifies the call routing system when the first agent system has been disconnected due to a recoverable error.

14. The apparatus of claim 11, wherein the plurality of agents are separated into a plurality of groups and wherein to prioritize the reconnection of the call, the program instructions direct the processing system to:
if a second agent of the plurality of agents in the same group of the plurality of groups as the first agent is available, reconnect the call to a second agent system operated by the second agent.

15. The apparatus of claim 14, wherein to prioritize the reconnection of the call, the program instructions further direct the processing system to:
if the second agent is not available but a supervisor of the same group is available, reconnect the call to a first supervisor system operated by the supervisor of the same group.

16. The apparatus of claim 15, wherein to prioritize the reconnection of the call, the program instructions further direct the processing system to:
if the second agent and the supervisor of the same group are not available but a third agent from a fallback group of the plurality of groups is available, reconnect the call to a third agent system operated by the third agent.

17. The apparatus of claim 16, wherein to prioritize the reconnection of the call, the program instructions further direct the processing system to:
if the second agent, the supervisor of the same group, and the third agent are not available but a supervisor of the fallback group is available, reconnect the call to a second supervisor system operated by the supervisor of the fallback group.

18. The apparatus of claim 17, wherein to prioritize the reconnection of the call, the program instructions further direct the processing system to:
if the second agent, the supervisor of the same group, the third agent, and the supervisor of the fallback group are not available, transfer a second notification to the first caller system indicating an estimated amount of time until the call will be reconnected.

19. The apparatus of claim 18, wherein to prioritize the reconnection of the call, the program instructions further direct the processing system to:
reconnect the call to a system operated by an agent or supervisor of the same group or the fallback group to first come available.

20. The apparatus of claim 18, wherein the second notification further provides the first caller with an option to convert the call to a text chat and the program instructions further direct the processing system to:
upon receiving an indication that the first caller has selected the option, convert the call to a text chat and connect the text chat to a fourth agent system operated by a fourth agent.

* * * * *